(12) United States Patent
Yang

(10) Patent No.: US 6,542,072 B1
(45) Date of Patent: Apr. 1, 2003

(54) INTERACTIVE BURGLAR-PROOF ALARM SYSTEM

(75) Inventor: Wu-Cnung Yang, Kaohsiung (TW)

(73) Assignee: Whetron Industrial Co., Ltd., Kaohsiung (TW)

( * ) Notice: Subject to any disclaimer, the term of this patent is extended or adjusted under 35 U.S.C. 154(b) by 0 days.

(21) Appl. No.: 09/969,042

(22) Filed: Oct. 3, 2001

(51) Int. Cl.[7] .................................................. B60R 25/10
(52) U.S. Cl. .................... 340/426; 340/541; 340/545.1; 340/565; 340/632; 340/825.71; 340/825.72
(58) Field of Search ............................ 340/426, 425.5, 340/540, 541, 517, 531, 539, 825.71, 825.72, 506, 428, 542, 545.1, 565, 632

(56) References Cited

U.S. PATENT DOCUMENTS

| | | | | | |
|---|---|---|---|---|---|
| 4,449,385 A | * | 5/1984 | Thirion et al. | ............... | 340/426 |
| 4,897,630 A | * | 1/1990 | Nykerk | ....................... | 340/426 |
| 5,451,926 A | * | 9/1995 | Li | ............................. | 340/426 |
| 5,641,999 A | * | 6/1997 | Kawashima | ........... | 340/825.72 |
| 5,889,472 A | * | 3/1999 | Nagel et al. | ................ | 340/426 |
| 6,009,320 A | * | 12/1999 | Dudley | ....................... | 340/426 |

* cited by examiner

Primary Examiner—Daniel J. Wu
Assistant Examiner—Daniel Previl
(74) Attorney, Agent, or Firm—Dennison, Schultz & Dougherty

(57) ABSTRACT

An AGH interactive burglar-proof safety system is disclosed, This system is a bidirectioanl transmission mode and includes a mobile module (GSM), a hand free module, a communication interface and a burglar-proof control mainframe. By this system, as the burglars enter into a car, it may inform the car owner immediately. Therefore, the car owner may execute necessary actions for this condition to prevent the action of the burglars so as to provide an interactive burglar-proof function.

3 Claims, 2 Drawing Sheets

INTERACTIVE BURGLAR-PROOF ALARM SYSTEM

FIELD OF THE INVENTION

The present invention relates to an AGH interactive burglar-proof safety system. By this system, as the burglars enter into a car, it may inform the car owner immediately. Therefore, the car owner may execute necessary actions for this condition so as to prevent the action of the burglars so as to provide an interactive burglar-proof function.

BACKGROUND OF THE INVENTION

Cars have become an necessary vehicle tools for modern people, but they are also expensive and thus are an important object to the burglars. Therefore, many different kinds of burglar-proof devices are commercially sold. However, these devices only emits alarm voices, but can not inform the car owner to process this condition or inform the relative unit to process it effectively.

There are three kinds of different burglar-proof systems in the prior art.

1. A close type: as burglars intrudes the car, it only triggers the burglar-proof device to emit alarm to threat the burglars, while the car owner can not know the condition of the car.
2. A calling type: it has a short distance unidirectional communication function. When the burglar-proof device is triggered, the calling module will emit signals to the receiver of the car owner to inform the car owner, while the car owner can not make an effective action to this condition.
3. A receiving type: It only has the function of unidirectional communication by a wireless communication system, while as the burglar-proof device is triggered, it makes no message to the car owner. It only adds a function of wireless remote control setting and releasing.

SUMMARY OF THE INVENTION

Accordingly, the primary object of the present invention is to provide a AGH interactive burglar-proof safety system, wherein the AGH interactive burglar-proof safety system is a bidirectional burglar-proof system so that the car owner may know the condition of the car at any time.

Another object of the present invention is to provide a AGH interactive burglar-proof safety system, wherein if the car is intruded by burglars, the burglar-proof mode can be actuated by a handset to control the burglar-proof mainframe to execute the burglar-proof operation.

A further object of the present invention is to provide a AGH interactive burglar-proof safety system, wherein when the car owner assures that the car is intruded by burglars. The car owner enters into passwords through a speech promise to remotely control the burglar-proof control mainframe 60 actively, for example, locking the car door, cutting the oil loop, interrupting the car power, etc.

To achieve above objects, the present invention provides a An AGH interactive burglar-proof safety system is disclosed, This system is a bidirectioanl transmission mode and includes a mobile module (GSM), a hand free module, a communication interface and a burglar-proof control mainframe. By this system, as the burglars enter into a car, it may inform the car owner immediately. Therefore, the car owner may execute necessary actions for this condition to prevent the action of the burglars so as to provide an interactive burglar-proof function.

The various objects and advantages of the present invention will be more readily understood from the following detailed description when read in conjunction with the appended drawing.

DETAILED DESCRIPTION OF THE PREFERRED EMBODIMENTS

Figure 1:
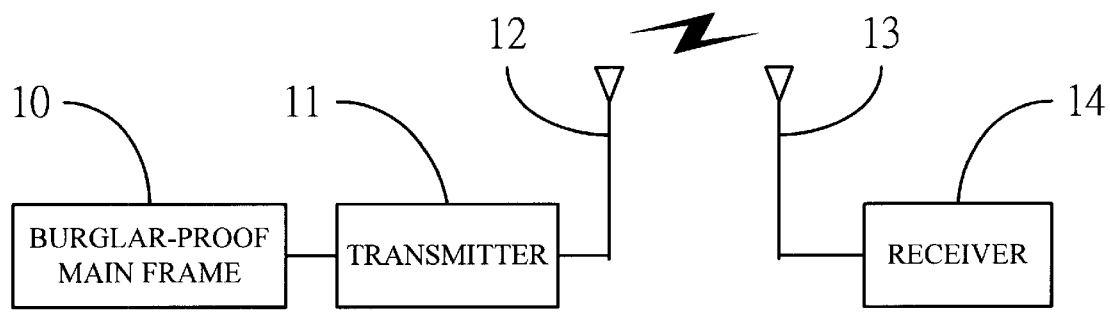
FIG. 1 is a block diagram of the prior art receiving type burglar-proof system.

Referring to FIG. 1, a prior art burglar-proof device is illustrated. It only has a function of short distance and unidirectional propagation. When a burglar-proof device installed in a car is triggered, the car burglar-proof mainframe 10 informs the transmitter 11 to emit a signal to the receiving antenna 13 of the car owner receiver 14 from a transmitting antenna 12. By this signal, the owner knows that the burglar-proof device is triggered.

Figure 2:
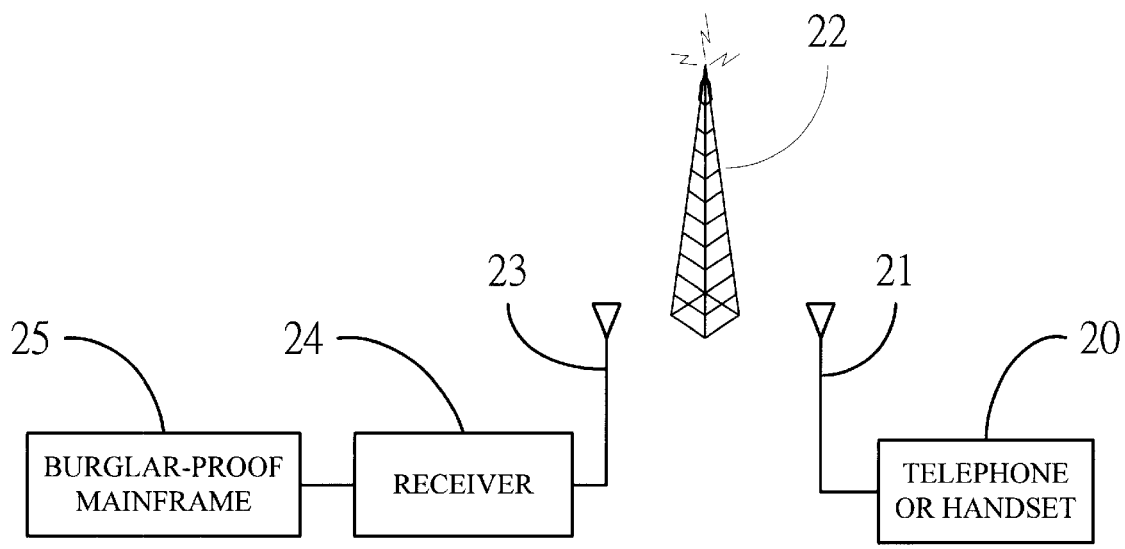
FIG. 2 is a block diagram of a prior art transmitting type burglar-proof system.

Referring to FIG. 2, the prior art burglar-proof device is made as a receiving type. In that, the owner emit a signal from a telephone or a handset 20. The signal is sent to the receiving antenna 23 of a car receiver from a calling center 22 of a communication service center. By the wireless signal is sent to the receiving antenna 23 of a receiver in the car, the receiver 24 has the function of controlling the setting and releasing the burglar-proof setting of a burglar-proof mainframe 25. However, this device only adds a wireless remote control and releasing function to the user instead of sending a burglar-proof trigger signal to the user.

Therefore, the prior art illustrated in FIGS. 1 and 2 only has the function of unidirectional communication or passive burglar-proof. If considering from the viewpoint of the whole safety, it is lack of activity and real-time response function.

Figure 3:
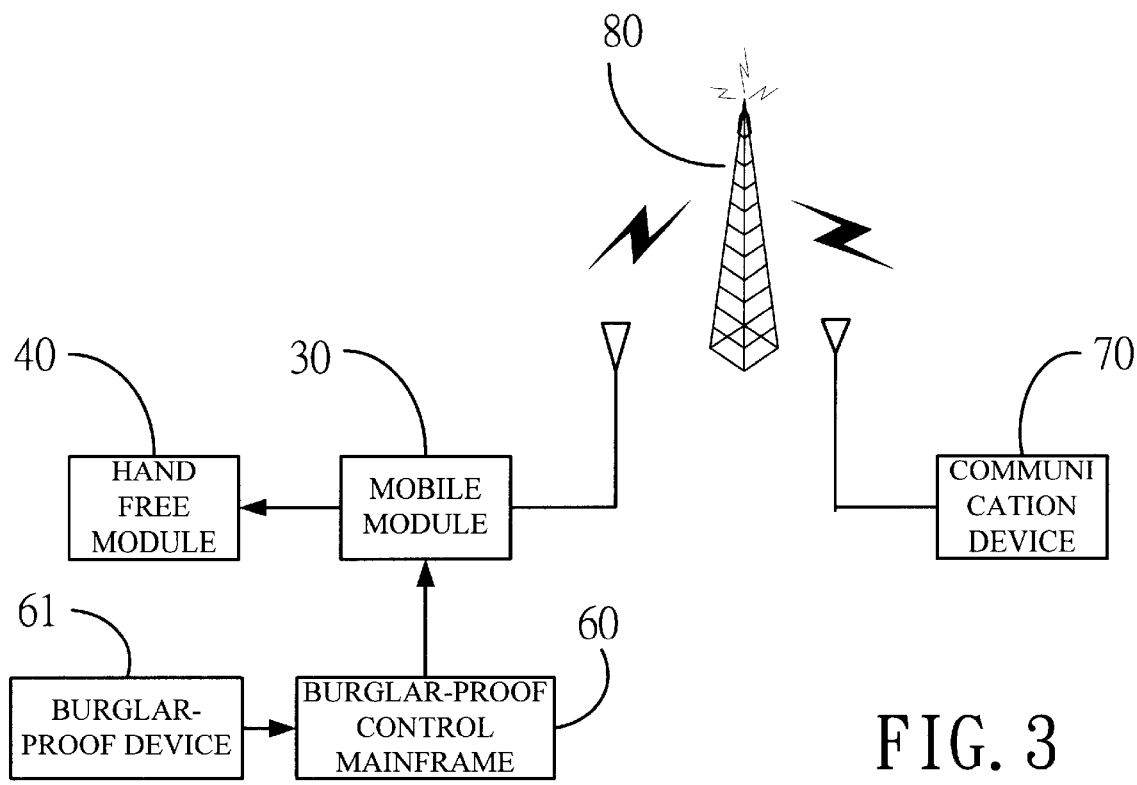
FIG. 3 is a flow diagram of the AGH interactive burglar-proof safety system of the present invention.

Referring to FIG. 3, the flow diagram of the AGH interactive burglar-proof safety system of the present invention is illustrated. This system is a bidirectioanl transmission mode and includes a mobile module (GSM) 30, a hand free module 40, a communication interface 50 and a burglar-proof control mainframe 60.

The mobile module 30 is installed in a car. When the alarm in a car is actuated, the burglar-proof control mainframe and the communication device of the car owner in the car is set into a bidirectional communication condition through a base station.

The hand free module 40 has the function of guiding the operational message to a car, returning message, and promise after conduction.

The burglar-proof control mainframe 60 is electrically connected to a plurality of burglar-proof device in the car and informs the burglar-proof condition through the communication interface. If the message is correct, then it emit a signal to the hand free module so that the trumpet in the car emit alarm voice. Another signal is emitted from the communication interface to request the mobile module to inform the car owner actively.

In the communication interface 50, when the burglar-proof control mainframe 60 is triggered, it will inform the car owner actively. The signal is sent to the communication device of the car owner through the base station 80 from the communication interface 50. The car owner knows that the car alarm system is triggered from the communication device 70. Then, the car owner emits a control signal through the communication device 70, which is sent to the base station 80 through the communication device 70 and then to an antenna on the car. After the signal is received through the communication device 50, it is sent to the hand free module 40 to execute the action requested by the car owner, such as emitting alarm voice, dialing, acknowledge, etc.

Therefore, the present invention includes the functions of burglar-proof, acknowledgement, remote controlling through a mobile module (GSM), hand free operation, etc.

Figure 4:
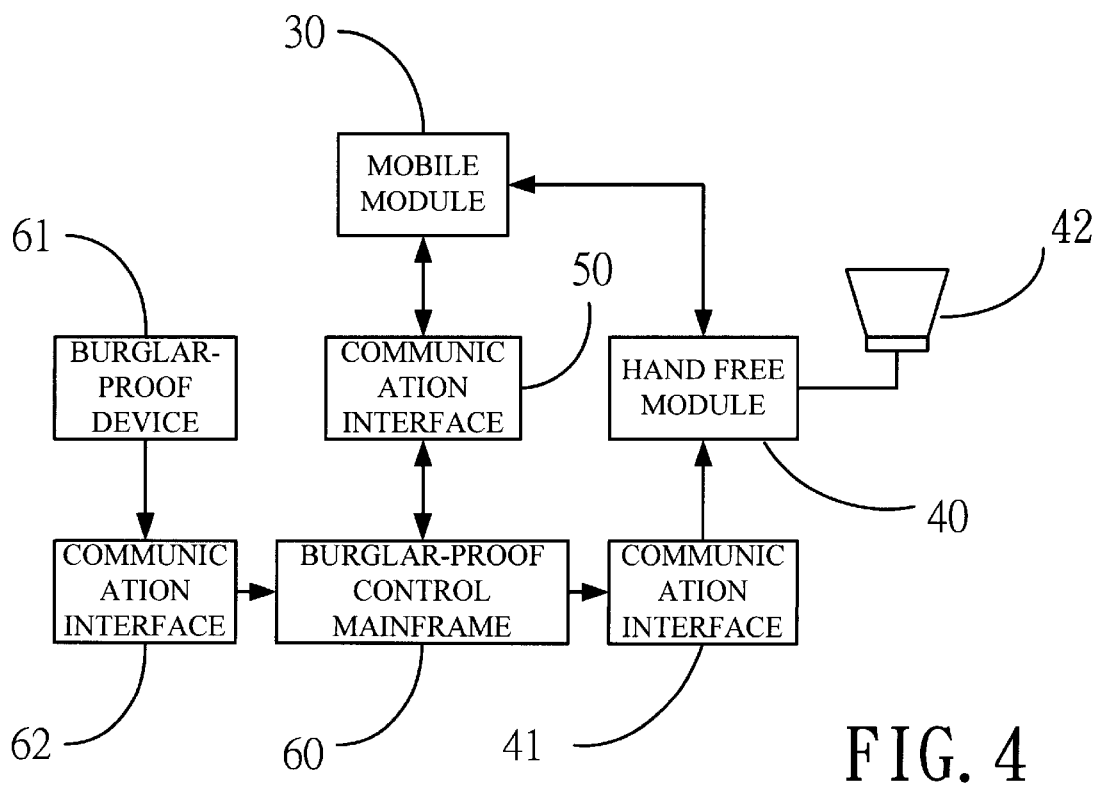
FIG. 4 is a block diagram of the AGH interactive burglar-proof safety system of the present invention.

Referring to FIG. 4, the operation flow diagram of the AGH interactive burglar-proof safety system of the present invention is illustrated. When a burglar-proof mainframe in a car is triggered 61, it will be informed to a burglar-proof control mainframe through the communication interface 62, after the burglar-proof control mainframe determines that the message is correct. Two signals are emitted. One is to the hand free module 40 Thereby, the communication interface 41 so as to the trumpet 42 in a car may be actuated. After the car owner has this message, the car owner enters a password according to the promise and then inputs selections, such as speech, monitoring, etc. Then the car owner is communicated with the hand free module 40 through the mobile module (GSM) 30.

When the car owner assures that the car is intruded by burglars. The car owner enters into passwords through a speech promise to remotely control the burglar-proof control mainframe 60 actively, for example, locking the car door, cutting the oil loop, interrupting the car power, etc.

If the trigger signal is acknowledged to be a mistake instead of an intrusion signal, the car owner may enter into the burglar-proof control mainframe through a communication interface and then enters into a password according to the speech promise to enter into the process of speech and monitoring to understand the condition of all parts of the car.

The AGH interactive burglar-proof safety system of the present invention has the following advantages:

1. The present invention is a bidirectional burglar-proof system so that the car owner may know the condition of the car at any time.
2. If the car is intruded by burglars, the burglar-proof mode can be actuated by a handset to control the burglar-proof mainframe to execute the burglar-proof operation.
3. The AGH interactive burglar-proof safety system of the present invention has a function of hand free operation to execute the operation of informing incoming callings, receiving a calling automatically, voice controlling, GSP satellite guiding through a VCD, networking by using an AUTO-PC, and GSM display, etc., such as short messages, speech mailbox, stock messages, banks, etc.

The present invention are thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An interactive burglar-proof alarm system for providing an interactive system for car owners comprising a mobile module, a hand free module, a burglar-proof control mainframe, a burglar-proof device, communication interface and alarm, all of which are installed in a car, and wherein said mobile module is activated in response to a signal from said alarm and wherein said burglar-proof control mainframe and said communication interface is set into a bidirectional communication condition through a base station and said hand free module functioning to dial an operational message to the car and returning a message, and said burglar-proof control mainframe electrically connected to said burglar-proof device and to inform the car owner of the burglar-proof condition through said communication interface and if the message is correct, emits a signal to the hand free module so that the alarm sounds and emits another signal from the communication interface to activate said mobile module to inform the car owner;

wherein when the burglar-proof control mainframe is triggered it informs the car owner; the signal is sent to a communication device of the car owner through a base station from the communication interface;

the car owner knowing that the alarm is triggered from the communication device remits a control signal through the communication device which is sent to the base station through the communication device and then to an antenna on the car; when the signal is received through the communication device it is sent to the hand free module to execute the requested action.

2. The interactive burglar-proof alarm system as claimed in claim 1, wherein the hand free module executes the operation of informing incoming calls, receiving a call automatically, voice controlling, GSP satellite guiding through a VCD, networking by using an AUTO-PC, and GSM display, etc., such as short messages, speech mailbox, stock messages, banks.

3. The interactive burglar-proof alarm system as claimed in claim 1, wherein the burglar-proof control mainframe executes the functions of locking the car door, cutting the oil loop, interrupting the car power, setting/releasing the functions of burglar-proof and silence.

* * * * *